United States Patent
Yang et al.

(10) Patent No.: US 11,086,657 B2
(45) Date of Patent: Aug. 10, 2021

(54) METHOD AND SYSTEM FOR SCHEDULING TRANSACTIONS IN A DATA SYSTEM

(71) Applicant: Oath Inc., New York, NY (US)

(72) Inventors: Guangxin Yang, Beijing (CN); Dongyue Wang, Beijing (CN); Xinyu Wang, Beijing (CN); Wei Liang, Beijing (CN); Sihan Ge, Beijing (CN)

(73) Assignee: Verizon Media Inc., New York, NY (US)

( * ) Notice: Subject to any disclaimer, the term of this patent is extended or adjusted under 35 U.S.C. 154(b) by 0 days.

(21) Appl. No.: 16/266,144

(22) Filed: Feb. 4, 2019

(65) Prior Publication Data

US 2019/0171479 A1    Jun. 6, 2019

Related U.S. Application Data

(63) Continuation of application No. 14/436,935, filed as application No. PCT/CN2015/075877 on Apr. 3, 2015, now Pat. No. 10,241,828.

(51) Int. Cl.
  *G06F 9/46*       (2006.01)
  *G06F 16/23*      (2019.01)
  *G06F 9/48*       (2006.01)

(52) U.S. Cl.
  CPC .............. *G06F 9/466* (2013.01); *G06F 9/485* (2013.01); *G06F 9/4887* (2013.01); *G06F 16/2379* (2019.01)

(58) Field of Classification Search
  None
  See application file for complete search history.

(56) References Cited

U.S. PATENT DOCUMENTS

| | | | |
|---|---|---|---|
| 6,457,065 B1* | 9/2002 | Rich | G06F 9/466 |
| | | | 719/328 |
| 7,774,219 B1 | 8/2010 | Meredith | |
| 2006/0095922 A1 | 5/2006 | Khan | |
| 2007/0220517 A1* | 9/2007 | Lippett | G06F 9/5038 |
| | | | 718/102 |
| 2008/0209421 A1 | 8/2008 | Scholtz | |
| 2009/0300017 A1 | 12/2009 | Tokusho et al. | |
| 2011/0153662 A1 | 6/2011 | Stanfill et al. | |
| 2011/0209151 A1 | 8/2011 | Chung | |

(Continued)

FOREIGN PATENT DOCUMENTS

CN    104317650 A    1/2015

OTHER PUBLICATIONS

International Preliminary Report on Patentability dated Oct. 12, 2017 in International Application PCT/CN2015/075877.

(Continued)

*Primary Examiner* — Kenneth Tang
(74) *Attorney, Agent, or Firm* — Pillsbury Winthrop Shaw Pittman LLP

(57) ABSTRACT

The present teaching relates to scheduling transactions at a node in a data system. In one example, a request is obtained for performing a first transaction at the node. A mixing condition associated with the first transaction is determined. The first transaction is initiated. The first transaction is suspended when the mixing condition is met. A second transaction is carried out at the node. The first transaction and the second transaction are directed to a same portion of data at the node.

18 Claims, 14 Drawing Sheets

(56) References Cited

U.S. PATENT DOCUMENTS

| | | | |
|---|---|---|---|
| 2012/0084477 A1* | 4/2012 | Arndt | G06F 9/3863 |
| | | | 710/266 |
| 2012/0246658 A1* | 9/2012 | Arndt | G06F 9/3834 |
| | | | 718/102 |
| 2018/0246755 A1* | 8/2018 | Ailamaki | G06F 9/5066 |

OTHER PUBLICATIONS

International Search Report and Written Opinion dated Jan. 11, 2016 in International Application PCT/CN2015/075877.

* cited by examiner

METHOD AND SYSTEM FOR SCHEDULING TRANSACTIONS IN A DATA SYSTEM

CROSS REFERENCE TO RELATED APPLICATION

The present application is a continuation of U.S. patent application Ser. No. 14/436,935 filed Apr. 20, 2015, which is a national stage application, filed under 35 U.S.C. § 371, of International Application No. PCT/CN2015/075877, filed on Apr. 3, 2015, entitled "METHOD AND SYSTEM FOR SCHEDULING TRANSACTIONS IN A DATA SYSTEM", which are hereby incorporated by reference in their entireties.

BACKGROUND

1. Technical Field

The present teaching relates to methods, systems, and programming for data processing. Particularly, the present teaching is directed to methods, systems, and programming for scheduling transactions in a data system.

2. Discussion of Technical Background

The advancement in the Internet has made it possible to make a tremendous amount of information accessible to users located anywhere in the world. This introduces new challenges in data processing for "big data," where a data set can be so large or complex that traditional data processing applications are inadequate. Scheduling is critical to achieve an efficient big data processing, especially for in-memory engines.

Since in-memory engines schedule transactions serially at each executor, conventional approaches do not allow mixed workloads on a single copy of data. As such, a long running transaction will block transactions that are either short-lived or with higher priorities. A traditional solution is to separate long running transactions and short-lived transactions, e.g. separating transactional and analytical workloads, which leads to two types of systems. In this manner, however, recent transactional data can only be used by analytical workloads after a long delay. In addition, maintaining two systems increases total cost of ownership significantly.

Therefore, there is a need to develop techniques to schedule transactions in a data system to overcome the above drawbacks.

SUMMARY

The present teaching relates to methods, systems, and programming for data processing. Particularly, the present teaching is directed to methods, systems, and programming for scheduling transactions in a data system.

In one example, a method, implemented on a machine having at least one processor, storage, and a communication platform connected to a network for scheduling transactions at a node in a data system is disclosed. A request is obtained for performing a first transaction at the node. A mixing condition associated with the first transaction is determined. The first transaction is initiated. The first transaction is suspended when the mixing condition is met. A second transaction is carried out at the node. The first transaction and the second transaction are directed to a same portion of data at the node.

In another example, a system, having at least one processor, storage, and a communication platform connected to a network for scheduling transactions at a node in a data system is disclosed. The system comprises a transaction analyzer, a mixing model selector, and a transaction execution module. The transaction analyzer is configured for obtaining a request for performing a first transaction at the node. The mixing model selector is configured for determining a mixing condition associated with the first transaction. The transaction execution module is configured for initiating the first transaction, suspending the first transaction when the mixing condition is met, and carrying out a second transaction at the node. The first transaction and the second transaction are directed to a same portion of data at the node.

Other concepts relate to software for implementing the present teaching on scheduling transactions. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for scheduling transactions at a node in a data system is disclosed. The information, when read by the machine, causes the machine to perform the following. A request is obtained for performing a first transaction at the node. A mixing condition associated with the first transaction is determined. The first transaction is initiated. The first transaction is suspended when the mixing condition is met. A second transaction is carried out at the node. The first transaction and the second transaction are directed to a same portion of data at the node.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
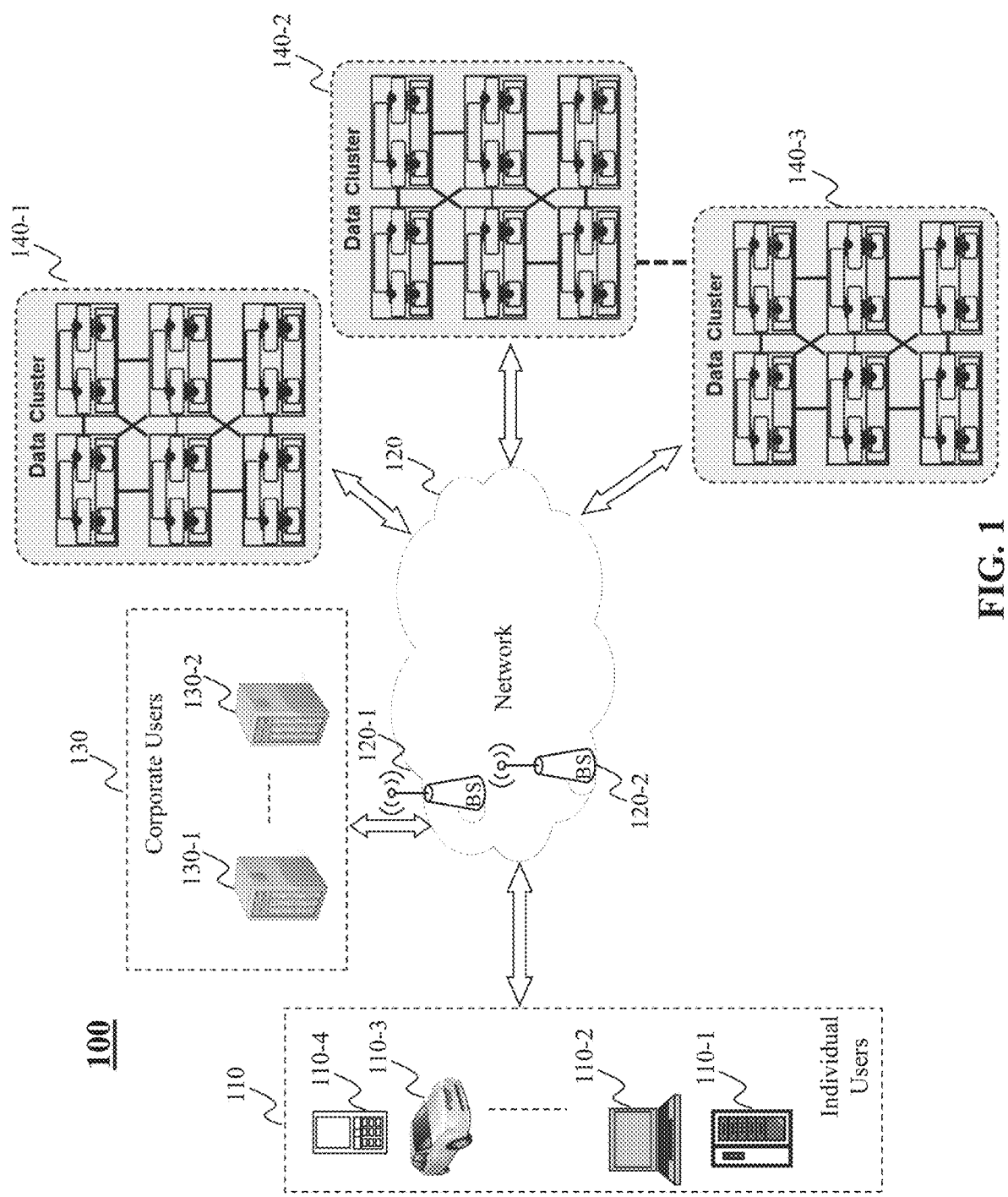
FIG. 1 is a high level depiction of an exemplary networked environment for scheduling transactions in a data system, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of scheduling transactions, realized as a specialized and networked system by utilizing one or more computing devices (e.g., mobile phone, personal computer, etc.) and network communications (wired or wireless). The method and system as disclosed herein aim at scheduling transactions in a data system in an effective and efficient manner.

A data engine, especially for an in-memory big data engine, schedules workloads serially at each executor. A transactional workload usually costs less time than an analytical workload. Accordingly, transactional and analytical workloads can be separated, which leads to two types of processing systems, e.g. an Online Transactional Processing (OLTP) and an Online Analytical Processing (OLAP) running side by side. An Extract-Transform-Load (ETL) process may periodically, often on a daily basis, move data from an OLTP system to an OLAP system. This means recent transactional data can only be used by analytical workloads after a long delay. Furthermore, maintaining two processing systems increases total cost of ownership (TCO) significantly. In some cases, this may cause data duplication and Operating System (OS) overhead.

The method and system disclosed in the present teaching can support mixed workloads on a single copy of data. Thus, there is no need of processing system separation, ETL, data duplication, or OS overhead. This can lead to much simplified system architecture and reduced TCO.

The system disclosed in the present teaching allows one workload to preempt another, e.g. allowing short-lived workloads to preempt long-running workloads so as to achieve prioritized scheduling. This can lead to an increased overall throughput and better system responsiveness. The solution disclosed in the present teaching will have the mechanism to ensure serialization of multiple transactions.

A data system may include a plurality of data clusters, each of which can include one or more network nodes. Data of interest here may be in form of a table that is horizontally divided into multiple partitions placed on a cluster. Each partition can be affiliated with a CPU core, which schedules by a scheduler and executes by an execution engine, single-partition transactions or part of a multiple-partition transaction serially. Each partition may have a queue, which keeps all transactions to be executed.

A transaction here may be expressed as a series of SQL or HiveQL statements, each of which can be represented as query plans. In the present teaching, the terms "transaction," "transaction job," and "job" will be used interchangeably. A query plan, or simply "query" may be logically a tree of basic operators such as scans, projections, joins, aggregations, etc. A transaction can be admitted into a scheduler of a partition with application specified priority. The execution engine in the partition may also infer the transaction's possible life span.

Normally transactions are executed one after another. In order to support mixed workloads, a long-running transaction may yield the CPU core at certain points during its lifetime so as to check whether there are other short-lived or higher priority transactions waiting to be executed. This check can be performed after the long-running transaction has been executed for a pre-determined time period or after a portion of the long-running transaction has been executed. The portion may be a fragment of the long-running transaction, a step in a fragment, a pre-determined number of blocks in a step, or a pre-determined number of records in a step. That is, the check for short-lived or higher priority transactions can be performed at a different level of granularity.

After the execution engine finishes executing a level of granularity, e.g. chosen based on system configuration, an execution thread in the partition may poll the queue and determine whether the current transaction should be preempted. If there is a higher priority transaction, the execution thread can save the current transaction's execution context and switch to execute the higher priority transaction. After the system executes the preempting transaction, the system can restore the context of the previous transaction for continuous execution. The preempting transaction may be a short-lived one, such that the preempting transaction can be finished early without causing much delay for the preempted transaction.

Once a preempted transaction is resumed after transaction switching, the system can make the preempted transaction face a same database state as before, as if the transaction switching never happened. As such, a transaction switching disclosed in the present teaching can improve overall throughput of the system without changing execution results of the transactions involved in the transaction switching.

In the data system disclosed in the present teaching, each execution thread can independently make a transaction switching decision, without coordinating with other threads when the transactions involve multiple partitions. This may lead to a simplified system control.

In one embodiment, a more sophisticated scheduler may allow preemption nesting, where an even higher priority transaction can preempt a preempting transaction. In another embodiment, after the preempted transaction is resumed, it may be preempted again by another higher priority transaction.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for scheduling transactions in a data system, according to an embodiment of the present teaching. In FIG. 1, the exemplary networked environment 100 includes corporate users 130, individual users 110, a network 120, and data clusters 140. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 120 may be an online advertising network or ad network that is a company connecting advertisers to web sites that want to host advertisements. The network 120 may also include various network access points, e.g., wired or wireless access points such as base stations or Internet exchange points 120-1 . . . 120-2, through which a data source may connect to the network 120 in order to transmit information via the network 120.

Individual users 110 may be of different types such as users connected to the network 120 via desktop computers 110-1, laptop computers 110-2, a built-in device in a motor vehicle 110-3, or a mobile device 110-4. An individual user 110 may send a request to one of the data clusters 140 via the network 120 for data processing. The data processing may be related to a transaction associated with one or more nodes in the data cluster. Each node may include one or more partitions. Each partition can be affiliated with a CPU core, which schedules by a scheduler and executes by an execution engine, single-partition transactions or part of a multiple-partition transaction serially. Each partition may have a queue, which keeps all transactions to be executed. After executing the transaction associated with one or more partitions, the node may generate and send a transaction complete notice to the user in response to the request.

More often than not, a corporate user 130-1 can send a request to the data clusters 140 via the network 120 for data processing. The corporate user 130-1 may represent a company, a corporation, a group of users, an entity, etc. For example, a company that is an Internet service provider may want to retrieve or record data related to online activities of users of the Internet service provided by the company. In that case, the data may be stored in the data clusters 140 as various types, e.g. in databases like Hive, HBase, HDFS, etc. This may be because users' online activities can include different types of actions and hence be related to different and heterogeneous types of data.

The data clusters 140 form a data system but connect to the network 120 via different gateways. Any of the data clusters 140-1, 140-2, 140-3 can receive a transaction request, from either a corporate user 130 or an individual user 110. In one embodiment, the request may be received randomly by a node in the cluster. Based on the request, the node receiving the request can determine a destination node and forward the request to the destination node for executing the requested transaction. In one embodiment, the request is for transaction associated with a partition in the destination node.

Before execution, an execution engine in the partition can determine a mixing condition associated with the transaction. For example, the mixing condition may be whether the transaction has been executed for a pre-determined time period. Then, after initiating the transaction, the execution engine may suspend the transaction when the mixing condition is met and switch to execute another transaction, referred as a preempting transaction. The preempting transaction can be directed to a same portion of data at the node as the suspended transaction, referred as a preempted transaction. After executing the preempting transaction, the execution engine can switch back to execute the preempted transaction. After completing a transaction, the node can generate and send a transaction complete notice to the user in response to the request. In one embodiment, the request is for a transaction associated with multiple partitions in the node. In that case, each partition may schedule and execute part of the multiple-partition transaction serially. Each partition may determine whether to perform a transaction switching based on transactions to be executed by that partition. Then, the node may generate and send a transaction complete notice to the user, after the multiple-partition transaction has been executed by different execution engines in different partitions.

Figure 2:
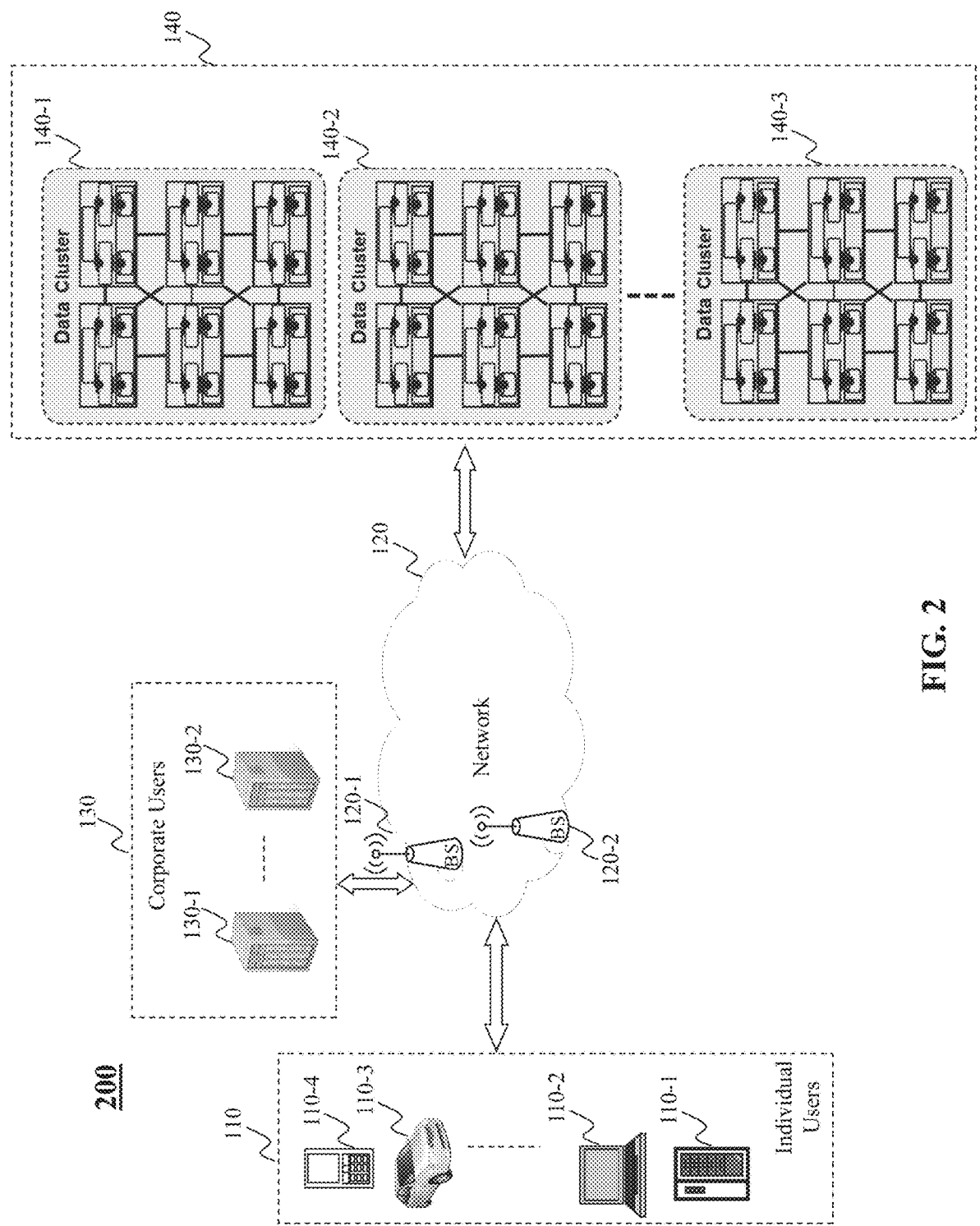
FIG. 2 is a high level depiction of another exemplary networked environment for scheduling transactions in a data system, according to an embodiment of the present teaching.

FIG. 2 is a high level depiction of another exemplary networked environment 200 for scheduling transactions in a data system, according to an embodiment of the present teaching. The exemplary networked environment 200 in this embodiment is similar to the exemplary networked environment 100 in FIG. 1, except that the data clusters 140 connect to each other with a local network, and connect to the network 120 e.g. via a global gateway.

Figure 3:
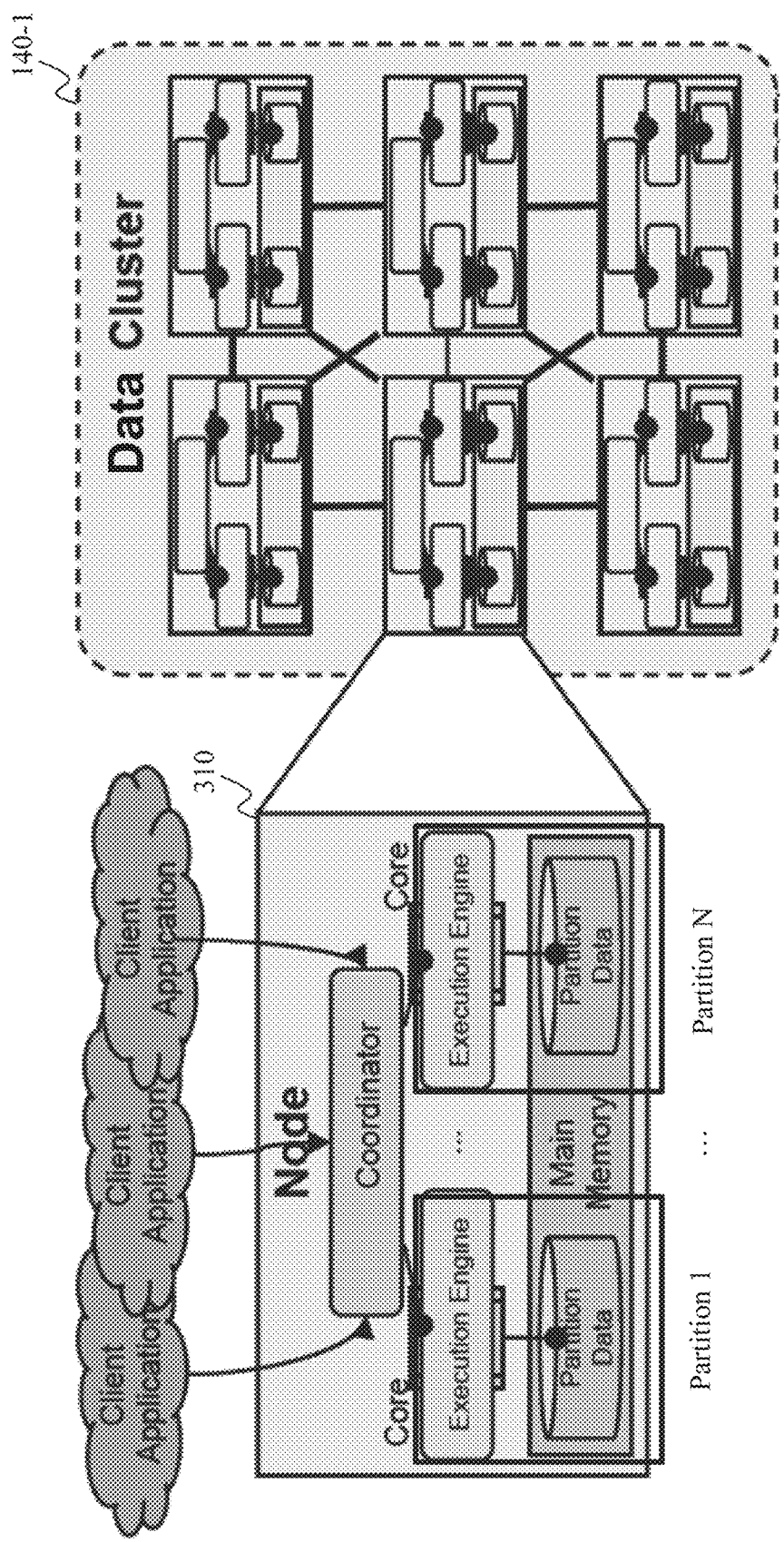
FIG. 3 illustrates a structure of a node in a data cluster, according to an embodiment of the present teaching.

FIG. 3 illustrates a structure of a node 310 in a data cluster 140-1, according to an embodiment of the present teaching. As illustrated in FIG. 3, the data cluster 140-1 includes a plurality of nodes connected to each other. Each node, e.g. the node 310, may include multiple partitions: partition 1 . . . partition N. Each partition may be associated with part of data in a main memory of the node, such that different partitions are associated with different parts of the data in the main memory. Each partition can be associated with a CPU core configured as an execution engine to execute transactions with respect to the partition data associated with the partition.

The node 310 may also include a coordinator configured for coordinating different partitions in the node 310. The coordinator may communicate with users, e.g. through client applications on the users.

Figure 4:
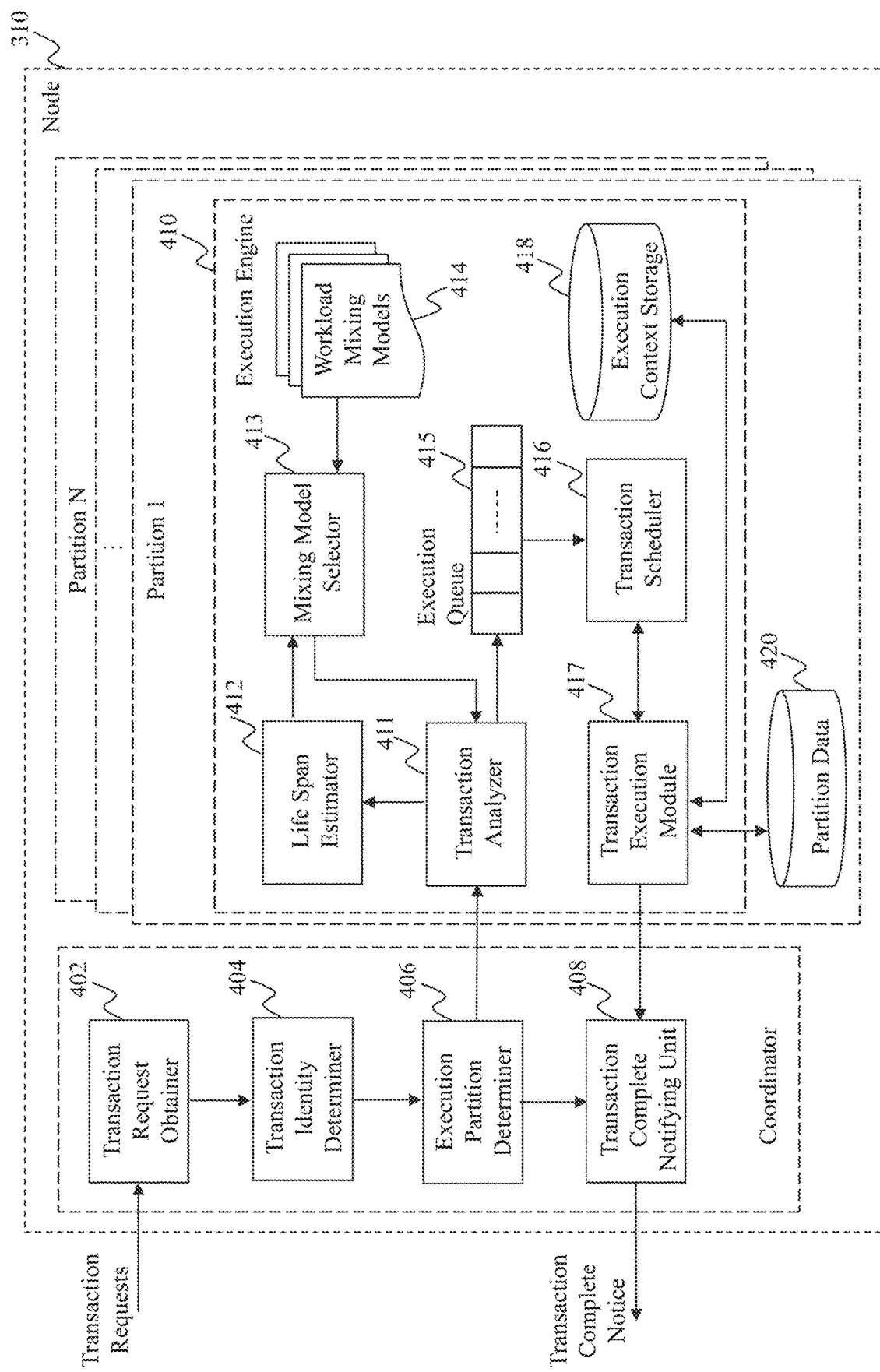
FIG. 4 illustrates an exemplary diagram of a node in a data cluster, according to an embodiment of the present teaching.

FIG. 4 illustrates an exemplary diagram of a node 310 in a data cluster, according to an embodiment of the present teaching. As discussed above, the node 310 may include a coordinator and one or more partitions: partition 1 . . . partition N.

As illustrated in FIG. 4, the coordinator in the node 310 of this example includes a transaction request obtainer 402, a transaction Identity determiner 404, an execution partition determiner 406, and a transaction complete notifying unit 408. The transaction request obtainer 402 in the node 310 in this example may obtain a transaction request, either from another node or directly from a user. The transaction Identity determiner 404 in this example can determine a transaction identity based on the request and forward the transaction identity to the execution partition determiner 406. The execution partition determiner 406 in this example may determine one or more partitions for executing the transaction, based on the request and/or the transaction identity. Then, the execution partition determiner 406 may send the request to the determined one or more partitions.

Without loss of generality, the execution partition determiner 406 in this example sends the request to partition 1. As illustrated in FIG. 4, partition 1 in this example includes an execution engine 410 and partition data 420. The execution engine 410 in this example includes a transaction analyzer 411, a life span estimator 412, a mixing model selector 413, one or more workload mixing models 414, an execution queue 415, a transaction scheduler 416, a transaction execution module 417, and an execution context storage 418.

The transaction analyzer 411 in this example receives the request for a transaction from the execution partition determiner 406 and analyzes the transaction at the partition 1. The transaction may be associated with metadata information based on the request. For example, the metadata information may include the transaction's type, e.g. transactional processing or analytical processing. A transaction processing may be related to retrieval of data meeting a given condition, deleting data meeting a given condition, changing data meeting a given condition, etc. An analytical processing may be related to calculating a trend based on data meeting given conditions, predicting a future price of a product based on the product's historical data, etc. For example, the metadata information may also include a priority of the transaction. The priority of the transaction may be determined based on e.g. the transaction's type, the transaction's dependency relationship with other transactions, system configuration of the transaction based on the user who sent the request, etc. The transaction analyzer 411 may determine and send the metadata information about the transaction to the life span estimator 412.

The life span estimator 412 in this example estimates a life span for the transaction job. In one embodiment, the life span estimator 412 estimates the life span based on the type of the transaction. For example, the node 310 can pre-configure a longer estimated life span to an analytical processing job, and pre-configure a shorter estimated life span to a transactional processing job. The pre-configuration may be based on historical life span data of the same type of transactions, e.g. based on an average life span of the transactions of the same type during last three months. The life span estimator 412 may send the estimated life span to the mixing model selector 413 for selecting a mixing model for the transaction.

As discussed above, a transaction switching may happen during execution of the transaction. The transaction switching may happen after some time based on one of the workload mixing models 414. The mixing model selector 413 in this example selects a workload mixing model for the transaction associated with the request.

A workload mixing model for a transaction may define a level of granularity at which a transaction switching can happen during execution of the transaction. The level of granularity may be a pre-defined time slot, a group of table blocks or rows, a plan node, a query plan fragment, etc.

As discussed above, a transaction may be expressed as a series of SQL or HiveQL statements, each of which can be represented as query plans. A query plan may be logically an execution tree of basic operators such as scans, projections, joins, aggregations, etc. A query plan fragment may be a subtree in a query plan's execution tree. A query plan fragment can be executed at multiple partitions, if that query needs to access data at multiple partitions. At each partition, the execution thread run at the execution engine can do transaction switching independently when a fragment finishes its execution. If the level of granularity selected by the mixing model selector 413 is a query plan fragment, the execution engine 410 will yield the CPU core after executing every query plan fragment of the transaction to check for potential transaction switching, e.g. based on whether there are other short-lived or higher priority transactions waiting to be executed.

A plan node may represent a single step in a query's execution tree or in a query plan fragment. Each plan node can take in an input table and generate an output table. If the level of granularity selected by the mixing model selector 413 is a plan node, the execution engine 410 will yield the CPU core after executing every plan node of the transaction to check for potential transaction switching, e.g. based on whether there are other short-lived or higher priority transactions waiting to be executed.

Since a plan node is executed with input and output tables, a long-running plan node may need to read multiple table rows, which are usually kept in multiple memory blocks. If the level of granularity selected by the mixing model selector 413 is a group of table rows or blocks, the execution engine 410 will yield the CPU core after executing a pre-determined number of table rows or blocks in every plan node of the transaction to check for potential transaction switching, e.g. based on whether there are other short-lived or higher priority transactions waiting to be executed.

A level of granularity may also be a pre-defined time slot. In this case, the execution engine 410 will yield the CPU core after executing the transaction for every time period equal to the pre-defined time slot to check for potential transaction switching. The execution thread can either use self-maintained time measurement or external timers, so that once a thread has been running for a certain period of time, it will pause and check a transaction queue for potential preempting transactions. Length of the time slot can be fixed or dynamically adjusted, e.g. based on the estimated life span of the transaction.

In one embodiment, a workload mixing model may be based on multiple levels of granularities. For example, the execution engine 410 will yield the CPU core after executing the transaction for a pre-defined time slot or after executing a query plan fragment of the transaction, whichever comes first.

The mixing model selector 413 may select the workload mixing model based on the estimated life span of the transaction. For example, if the estimated life span is long, the mixing model selector 413 may select a workload mixing model to switch transactions after executing the transaction for a pre-defined time slot. If the estimated life span is short, the mixing model selector 413 may select a workload mixing model to switch transactions after executing every plan node of the transaction.

The mixing model selector 413 may also select the workload mixing model based on the priority of the transaction. In one embodiment, if the estimated life span is very short and/or if the transaction has a very high priority, the mixing model selector 413 may select a workload mixing model such that no transaction switching can happen during execution of the transaction. That is, the transaction may preempt other transactions but may not be preempted by other transactions.

The mixing model selector 413 may send the selected mixing model to the transaction analyzer 411. The transaction analyzer 411 may then determine a workload mixing scheme for the transaction based on the selected mixing model, and store the transaction associated with the workload mixing scheme into the execution queue 415. In one embodiment, the transaction may be stored into the execution queue 415 based on its associated priority.

The execution queue 415 in this example stores different transactions to be executed at this partition 1. The transaction scheduler 416 in this example can retrieve a transaction from the execution queue 415 for execution. In one case, when the execution queue 415 follows a first in first out (FIFO) rule, the transaction scheduler 416 may retrieve the next transaction for execution, i.e. the earliest transaction stored in the execution queue 415. In another case, the transaction scheduler 416 may find and retrieve a preempting transaction from the execution queue 415 to preempt a current transaction or preempted transaction. In one example, the preempting transaction may be an earliest transaction in the execution queue 415 that has a higher priority than the preempted transaction. In another example, the preempting transaction may be an earliest transaction in the execution queue 415 that has a short estimated life span than the preempted transaction. In yet another example, the preempting transaction may be an earliest transaction in the execution queue 415 that has an estimated life span shorter than a pre-determined threshold.

In one embodiment, the transaction scheduler 416 retrieves a non-preempting transaction associated with its workload mixing scheme from the execution queue 415, and sends the non-preempting transaction associated with its workload mixing scheme to the transaction execution module 417 for execution. The transaction execution module 417 in this example may execute the non-preempting transaction with respect to the partition data 420 and yield to check for a potential preemption based on the mixing scheme. For example, based on one mixing scheme, the transaction execution module 417 may yield to check for a potential preemption after executing the transaction for a pre-determined time period, e.g. ten minutes. The transaction scheduler 416 may help to determine whether there is a preempting transaction in the execution queue 415. In one example, if the transaction scheduler 416 determines and informs the transaction execution module 417 that there is no preempting transaction in the execution queue 415, the transaction execution module 417 may continue executing the non-preempting transaction until next preemption checking point based on the workload mixing scheme. In another example, if the transaction scheduler 416 determines and informs the transaction execution module 417 that there is a preempting transaction in the execution queue 415, the transaction execution module 417 may record execution context for the preempted transaction into the execution context storage 418 and switch to execute the preempting transaction. The execution context may include any temporary tables, certain pointers like row/block iterators, plan definitions, etc. that are related to the preempted transaction.

After executing the preempting transaction, the transaction execution module 417 may generate and send a complete notice for the preempting transaction. Then, the transaction execution module 417 may retrieve the execution context for the preempted transaction from the execution context storage 418 and continue to execute the non-preempting and preempted transaction. If the execution of the preempted transaction is complete before the next preemption checking point based on the workload mixing scheme, the transaction execution module 417 may generate and send a complete notice for the preempted transaction. Otherwise, if the execution of the preempted transaction is not complete when the next preemption checking point comes, the transaction execution module 417 can yield again to check for potential preemption.

In another embodiment, the transaction scheduler 416 retrieves a preempting transaction associated with its workload mixing scheme from the execution queue 415, and sends the preempting transaction associated with its workload mixing scheme to the transaction execution module 417 for execution. In one example, the transaction execution module 417 may execute the preempting transaction with respect to the partition data 420 without checking for any potential preemption. In this example, the system does not support preemption nesting, and a preempting transaction cannot be preempted by other transactions. In another example, the transaction execution module 417 may execute the preempting transaction and check for potential preemption based on its associated workload mixing scheme. In this example, the system does support preemption nesting, and a preempting transaction may be preempted by another transaction. Whether to support preemption nesting may depend on implementation of the system.

In either embodiment, the preempted transaction and the preempting transaction are directed to the same partition data 420. Therefore, once a preempted transaction is resumed, it is desirable to make sure the preempted transaction faces the same database state as if transaction switching never happened. As a preempting transaction might modify the partition data, in order to give the resumed transaction that illusion, each tuple or record in the partition data 420 can be marked with a tuple status flag. In the present teaching, the terms "tuple" and "record" may be used interchangeably to indicate a data record in the data partition. A tuple status flag for a tuple may indicate how the tuple is changed by preempting transactions. There are different ways to implement these flags. For example, one approach may be to use a 3-bit space to differentiate the following cases, each of which corresponds to a tuple status flag in the parentheses thereafter:

No-Change (NC) indicates that the tuple is neither updated nor deleted;

Inserted-w/o-Delete (IoD) indicates that the tuple is inserted by a preempting transaction;

Inserted-with-Delete (IwD) indicates that the flag is changed to IwD if a tuple marked as IoD is deleted by a successive preempting transaction;

Deleted (D) indicates that the tuple is deleted by a preempting transaction;

Updated-w/o-Delete (UoD) indicates that the tuple is updated by a preempting transaction;

Updated-with-Delete (UwD) indicates that the flag is changed to UwD if a tuple marked as UoD is deleted by a successive preempting transaction.

These flags may require additional memory space. But when changes made by preempting transactions are not that many, which is usually the case, the memory overhead can be neglected. To make the preempted transaction face the same database state as if transaction switching never happened, when the preempted transaction is resumed, tuples marked as D should be included, while tuples marked as IoD or IwD should be excluded. For UoD and UwD tuples, the scan should return the tuple values kept in the tuple's change history. Different types of changes made by preempting transactions will be discussed in detail below with respect to FIGS. 10-12.

Figure 10:
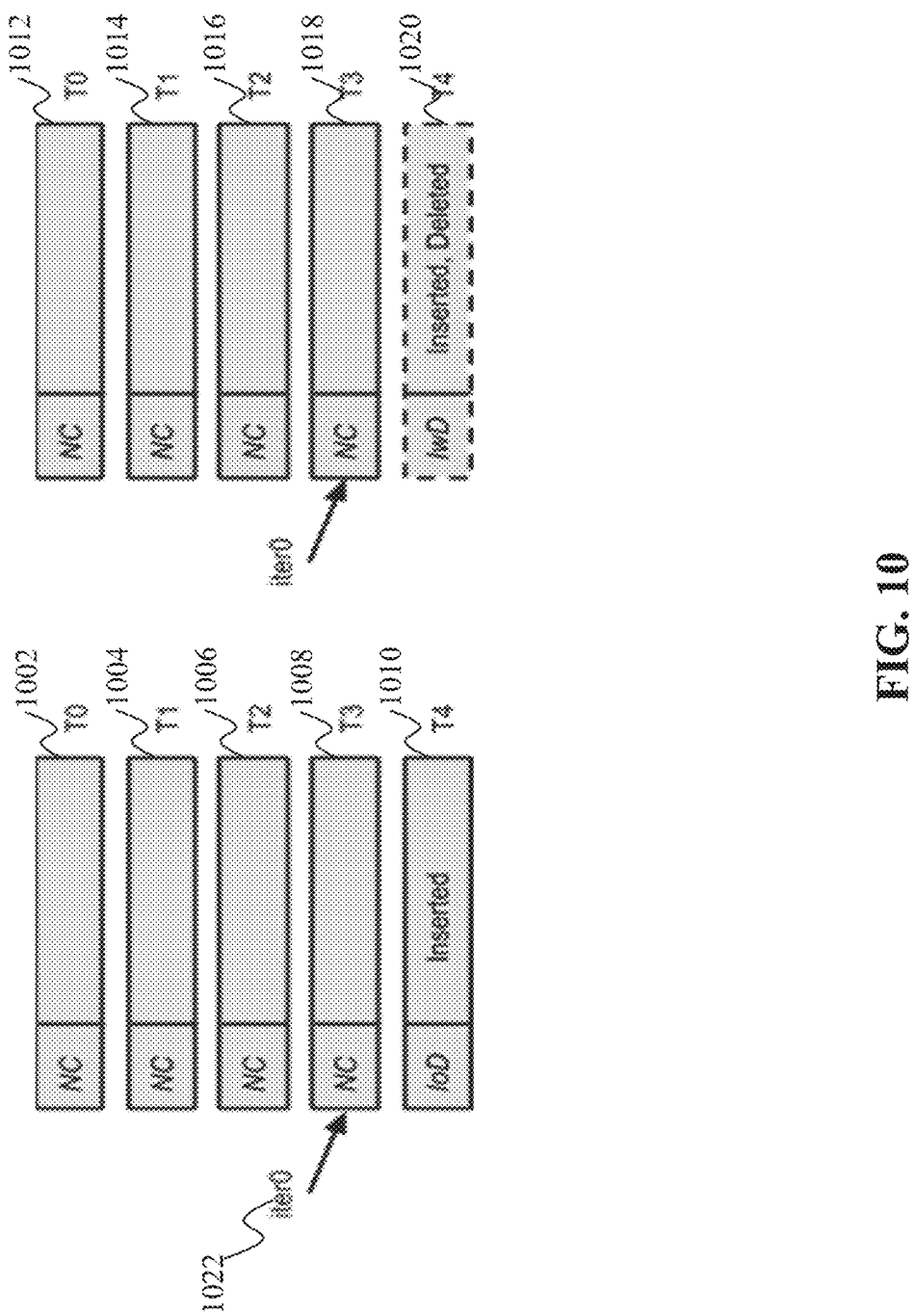
FIG. 10 illustrates an exemplary process for handling records inserted by a preempting transaction, according to an embodiment of the present teaching.

FIG. 10 illustrates an exemplary process for handling records inserted by a preempting transaction, according to an embodiment of the present teaching. In this example, suppose transaction txn0 is a long running OLAP query, which, without loss of generality, contains a full table scan. Thus, the transaction txn0 will scan the tuples one by one, from T0 1002 to T3 1008, as shown on the left side of FIG. 10. In this example, before a scan iterator iter0 1022 reaches tuple T3 1008, transaction txn1 preempts and inserts T4 1010, which will be marked as Inserted-w/o-Delete (IoD). When transaction txn0 resumes and iter0 1022 reaches T4 1010, the system can check these flags and discover that T4 is inserted by a preempting transaction and should be skipped. In such a manner, tuples inserted by preempting transactions will be excluded during the scanning of a preempted transaction. As such, result of the full table scan of the preempted transaction will not be affected by the preempting transaction. After the preempted transaction finishes, the tuple status flags for all remaining tuples may be set to NC, such that a later non-preempting transaction will not worry about the previous tuple changes.

In another case, after txn1 finishes and before txn0 finishes, another transaction txn2 preempts and deletes T4 1020, which will be marked as Inserted-with-Delete (IwD). Again, when txn0 resumes and iter0 1022 reaches T4 1020, the system can check the tuple status flag associated with T4 1020 and thus skip T4 1020 for txn0. After the preempted transaction finishes, the tuple status flags for all remaining and not-deleted tuples will be set to NC, and the tuple T4 1020 is deleted accordingly.

Figure 11:
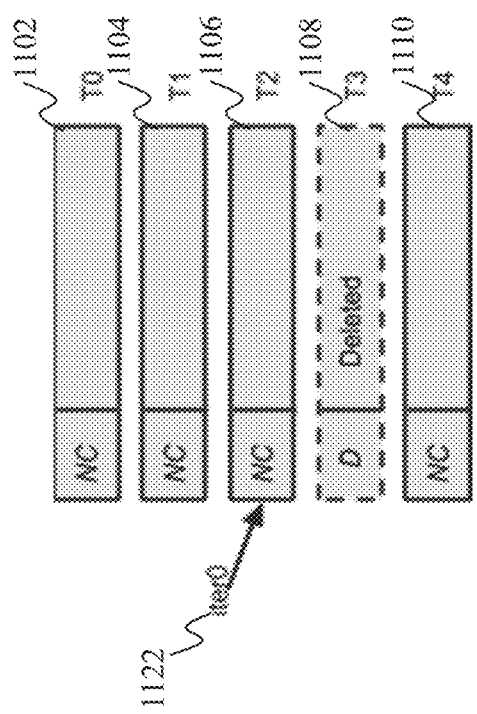
FIG. 11 illustrates an exemplary process for handling records deleted by a preempting transaction, according to an embodiment of the present teaching.

FIG. 11 illustrates an exemplary process for handling records deleted by a preempting transaction, according to an embodiment of the present teaching. In this example, transaction txn0 is a long running ready query, whose plan contains a table scan. Before txn0's scan iterator iter0 1122 reaches tuple T3 1108, transaction txn1 preempts and deletes tuple T3 1108. Accordingly, T3 1108 will be marked as deleted (D).

In one case, when txn0 resumes and iter0 1122 reaches T3 after txn1 finished, the system can check these flags and discover that T3 1108 is deleted by a preempting transaction but should be read by txn0. After the preempted transaction finishes, the tuple status flags for all remaining and not-deleted tuples will be set to NC, and the tuple T3 1108 is deleted accordingly.

In another case, if transaction txn1 preempts txn0 again before iter0 reaches T3 1108, no matter txn1 updates/deletes T3 or not, txn1's iterator iter1 will ignore T3 and keep T3's flag as D. Then after txn0 resumes, iter0 1122 will do the same as the previous case to read T3 1108. After the preempted transaction finishes, the tuple status flags for all remaining and not-deleted tuples will be set to NC, and the tuple T3 1108 is deleted accordingly.

Figure 12:
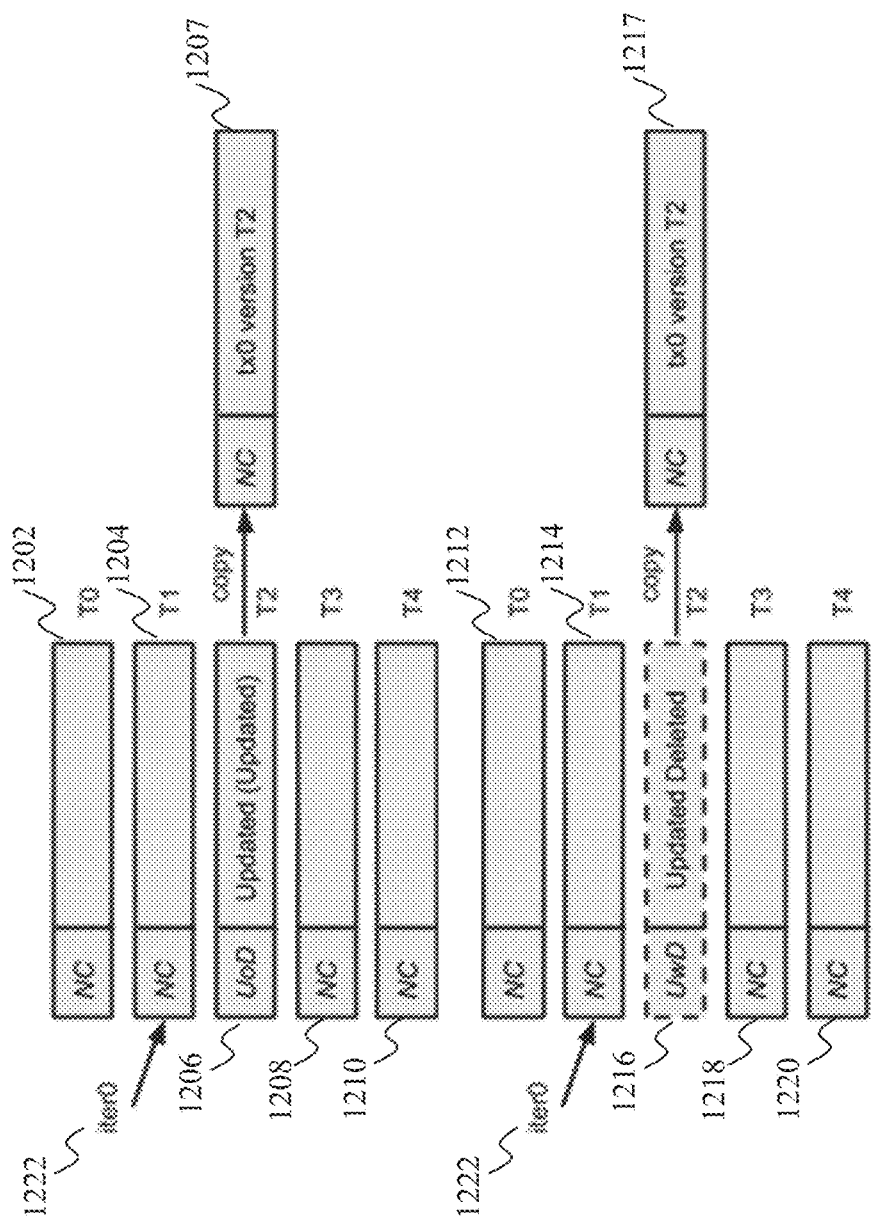
FIG. 12 illustrates an exemplary process for handling records updated by a preempting transaction, according to an embodiment of the present teaching.

FIG. 12 illustrates an exemplary process for handling records updated by a preempting transaction, according to an embodiment of the present teaching. In this example, transaction txn0 is a long running ready query, whose plan contains a table scan. Before txn0's scan iterator iter0 1222 reaches tuple T2 1206, transaction txn1 preempts and updates tuple T2 1206. The tuple status flag for T2 1206 may be set to UoD. But before the transaction txn1 updates tuple T2 1206, the system can make a copy 1207 of the tuple T2 in the tuple's change history.

A tuple's change history may be space reserved for a tuple to record old and new versions of the tuple during changes. If the preempting transaction modifies a tuple, the tuple's change history may include the state of the tuple before the modification is made. Once the preempted transaction resumes, if the tuple is read, the system will use version kept in the history, instead of the one kept in the tuple's storage. When the preempted transaction terminates, the history created for it can be cleared.

Referring to the above example, if there is no transaction to delete the tuple T2 in future, this flag will be kept UoD 1206, otherwise it will be set to UwD 1216. The preempted transaction txn0 will read the version in tuple's change history and the later transaction will read the updated version for UoD 1206 or just skip for UwD 1216. Once txn0 finishes, it will truncate or delete the old version data in tuple's change history, and delete tuples with UwD status.

The reason for differentiating with- and without-Delete for Inserted and Updated is that if successive preempting transactions delete a tuple inserted or updated by the first preempting transaction, the resuming transaction need to know this. Once the preempted transaction finishes its execution, all remaining tuple flags should reset to NC.

Referring back to FIG. 4, the transaction complete notifying unit 408 in this example receives complete notices from each partition with respect to different transactions. Based on the complete notices from the partitions, the transaction complete notifying unit 408 may determine whether a transaction is complete. In one embodiment, the transaction is a single-partition transaction, such that the transaction complete notifying unit 408 can determine the transaction is complete once a complete notice is received from the associated partition. In another embodiment, the transaction is a multiple-partition transaction, such that the transaction complete notifying unit 408 can determine the transaction is complete only after a complete notice is received from each of the associated partitions. The execution partition determiner 406 may send information about the associated partition(s) to the transaction complete notifying unit 408. After determining the transaction is complete, the transaction complete notifying unit 408 may generate and send a transaction complete notice to the user in response to the request.

Figure 5:
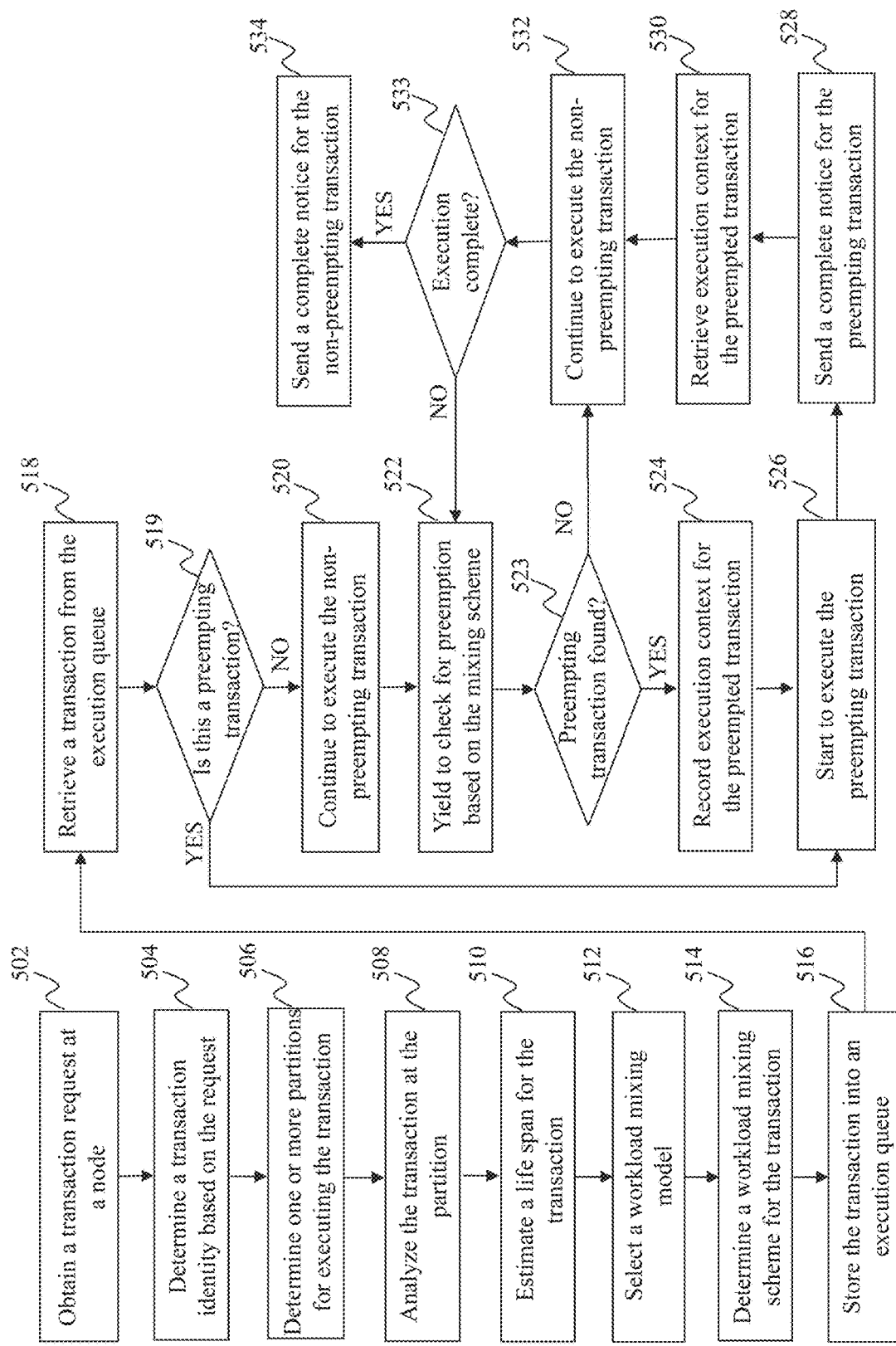
FIG. 5 is a flowchart of an exemplary process performed by a node in a data cluster, according to an embodiment of the present teaching.

FIG. 5 is a flowchart of an exemplary process performed by a node in a data cluster, e.g. the node 310 in FIG. 4 according to an embodiment of the present teaching. At 502, a transaction request is obtained at the node, either from another node or directly from a user. At 504, a transaction identity is determined based on the request. At 506, one or more partitions are determined for executing the transaction. At 508, the transaction is analyzed at a partition, e.g. to determine a priority of the transaction. At 510, a life span is estimated for the transaction, e.g. based on the transaction's type. At 512, a workload mixing model is selected for the transaction, e.g. based on the transaction's life span, the transaction's type, and/or the transaction's priority. At 514, a workload mixing scheme is determined for the transaction, e.g. based on the selected workload mixing model. At 516, the transaction is stored associated with the workload mixing scheme into an execution queue.

At 518, a transaction is retrieved from the execution queue for execution. At 519 it is determined that whether this is a preempting transaction or not. If so, the process goes to 526 to execute the preempting transaction. Otherwise, this is a non-preempting transaction, and the process goes to 520 to continue executing the non-preempting transaction. At 522, the system yields to check for preemption based on the mixing scheme associated with the non-preempting transaction.

At 523, it is determined whether any preempting transaction is found. If so, the process goes to 524, where execution context is recorded for the preempted transaction, then at 526 the system start to execute the preempting transaction. The execution context may include any temporary tables, certain pointers like row/block iterators, plan definitions, etc. that are related to the preempted transaction. Otherwise, the process goes to 532 to continue executing the non-preempting transaction.

After the preempting transaction is executed, at 528, a complete notice for the preempting transaction is generated and sent. At 530, execution context for the preempted transaction is retrieved and restored. At 532, the system continues to execute the non-preempting transaction, e.g. based on the restored execution context.

At 533, it is determined whether execution of the non-preempting or preempted transaction is complete. If so, the process goes to 534, where a complete notice for the non-preempting transaction is generated and sent. Otherwise, the process goes back to 522 to yield the CPU core to check for preemption based on the mixing scheme.

Figure 6:
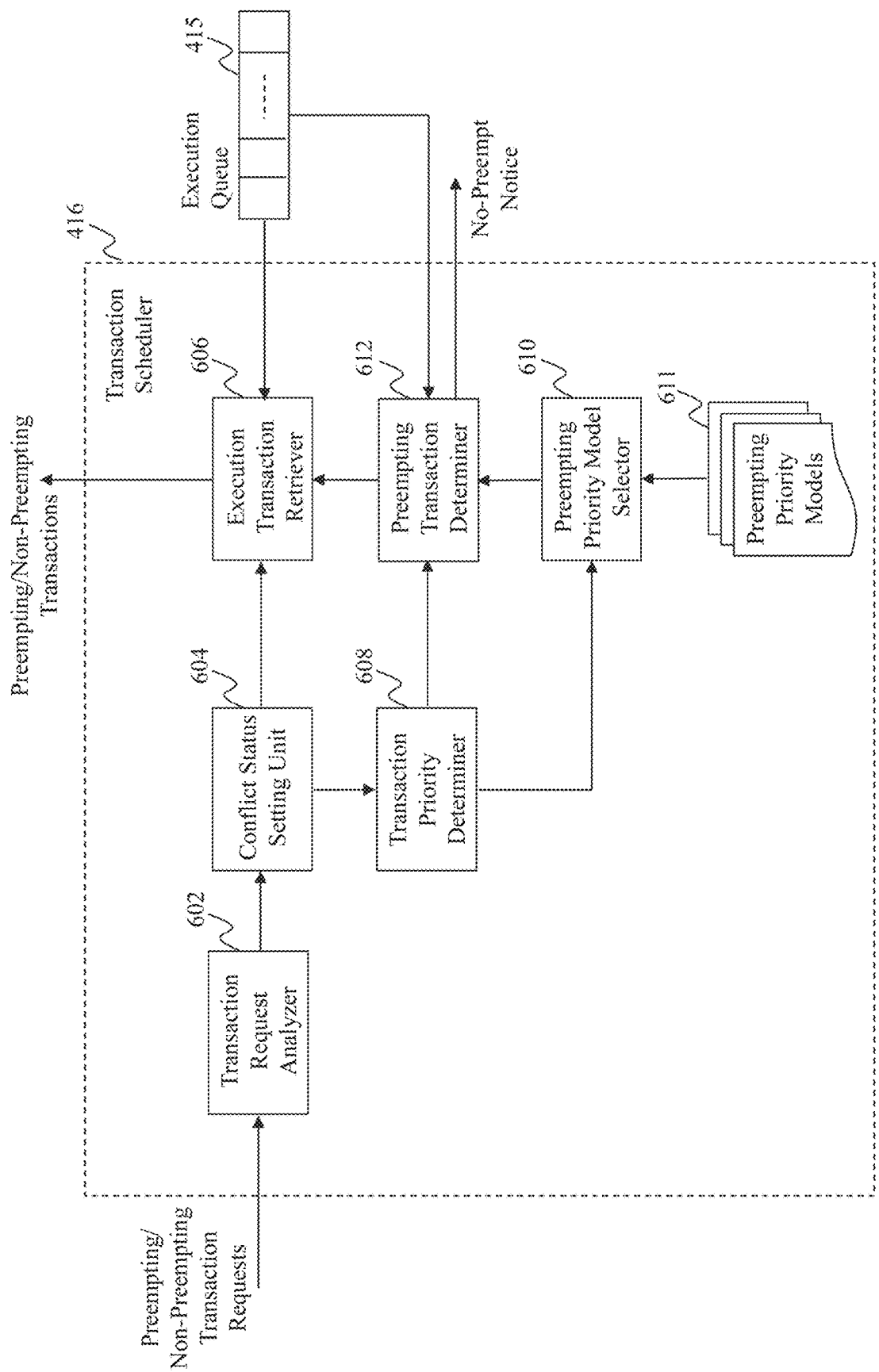
FIG. 6 illustrates an exemplary diagram of a transaction scheduler, according to an embodiment of the present teaching.

FIG. 6 illustrates an exemplary diagram of a transaction scheduler 416, according to an embodiment of the present teaching. The transaction scheduler 416 in this example includes a transaction request analyzer 602, a conflict status setting unit 604, an execution transaction retriever 606, a transaction priority determiner 608, a preempting priority model selector 610, one or more preempting priority models 611, and a preempting transaction determiner 612.

The transaction request analyzer 602 in this example receives and analyzes transaction requests from the transaction execution module 417. In one case, the transaction execution module 417 may send the transaction request analyzer 602 a transaction request for a preempting transaction, after the transaction execution module 417 executes a preempted transaction for a while, e.g. after executing a query plan fragment, a plan node, or some table blocks of the preempted transaction. In another case, the transaction execution module 417 may send the transaction request analyzer 602 a transaction request for a non-preempting transaction, after the transaction execution module 417 finishes executing a preempted transaction.

In one embodiment, the transaction request analyzer 602 may have the same structure as the transaction analyzer 411. In another embodiment, the transaction request analyzer 602 and the transaction analyzer 411 may be a same unit located in the execution engine 410.

The transaction request analyzer 602 may send the analyzed information of the transaction request to the conflict status setting unit 604. The conflict status setting unit 604 in this example can set up a conflict status for the partition based on the request. The partition's conflict status may indicate whether there is a preempted transaction on this partition. In one example, the conflict status setting unit 604 sets up the conflict status to indicate an existing preempted transaction on the partition, if the transaction request is for a preempting transaction. In another example, the conflict status setting unit 604 sets up the conflict status to indicate that there is no preempted transaction on the partition, if the transaction request is for a non-preempting transaction.

The conflict status can be explicitly kept in an execution thread specific variable, or can be inferred from whether there are structures for saving a transaction's execution context. If the conflict status indicates that there is a preempted transaction on this partition, the system may check the tuple status flags carefully so that dirty data are excluded during table scanning, e.g. as discussed above regarding FIGS. 10-12.

If the transaction request is for a non-preempting transaction, the conflict status setting unit 604 may send the information about the request to the execution transaction retriever 606 for transaction retrieval. If the transaction request is for a preempting transaction, the conflict status setting unit 604 may send the information about the request to the transaction priority determiner 608 to determine a priority of the preempted transaction.

The execution transaction retriever 606 in this example retrieves a transaction from the execution queue 415 and sends the retrieved transaction to the transaction execution module 417 for execution. In one example, the transaction may be a non-preempting transaction, if the information from the conflict status setting unit 604 indicates that the transaction execution module 417 requests for a non-preempting transaction. In this case, the execution transaction retriever 606 may retrieve the next transaction waiting in the execution queue 415 or the transaction having a highest priority in the execution queue 415. In another example, the transaction may be a preempting transaction, if the information from the conflict status setting unit 604 indicates that the transaction execution module 417 requests for a preempting transaction. In this case, the execution transaction retriever 606 may retrieve a transaction that has a higher priority than the preempted transaction and a highest priority in the execution queue 415.

The transaction priority determiner 608 in this example determines a priority for the preempted transaction, if the request is for a preempting transaction. The priority may be determined based on system configuration, the transaction's type, the user requesting the transaction, etc. The transaction priority determiner 608 can send the priority information about the preempted transaction to the preempting transaction determiner 612 and the preempting priority model selector 610.

The preempting priority model selector 610 in this example selects one of the preempting priority models 611. A preempting priority model may define a manner to determine a preempting transaction. For example, according to a preempting priority model, the preempting transaction should have a shorter estimated life span than that of the preempted transaction. In another example, according to a preempting priority model, the preempting transaction should have an estimated life span shorter than a certain threshold. In yet another example, according to a preempting priority model, the preempting transaction should have a priority higher than that of the preempted transaction or a certain threshold. In still another example, according to a preempting priority model, the preempting transaction should be requested by a user different from the user requesting the preempted transaction.

The preempting priority model selector 610 may select a preempting priority model based on information about the preempted transaction, e.g. how long has the preempted transaction being executed. For example, if the preempted transaction has been executed for just a short time, the preempting priority model selector 610 may select a loose preempting priority model such that it is easy to find a preempting transaction. In another example, if the preempted transaction has been executed for a long time or has been preempted for many times, the preempting priority model selector 610 may select a tighter preempting priority model such that it is more difficult to find a preempting transaction. The preempting priority model selector 610 may send the selected preempting priority model to the preempting transaction determiner 612 to determine a preempting transaction.

The preempting transaction determiner 612 in this example receives priority information of the preempted transaction and the selected preempting priority model. Based on the selected preempting priority model, the preempting transaction determiner 612 may determine a preempting transaction in the execution queue 415 and send information about the preempting transaction, e.g. a transaction identity, to the execution transaction retriever 606 for retrieving the preempting transaction from the execution queue 415.

In one embodiment, the preempting transaction determiner 612 determines that there is no preempting transaction in the execution queue 415 satisfying the condition set up based on the selected preempting priority model. In this case, the preempting transaction determiner 612 may generate and send a no-preempt notice to the transaction execution module 417 to indicate that no preempting transaction is found.

Figure 7:
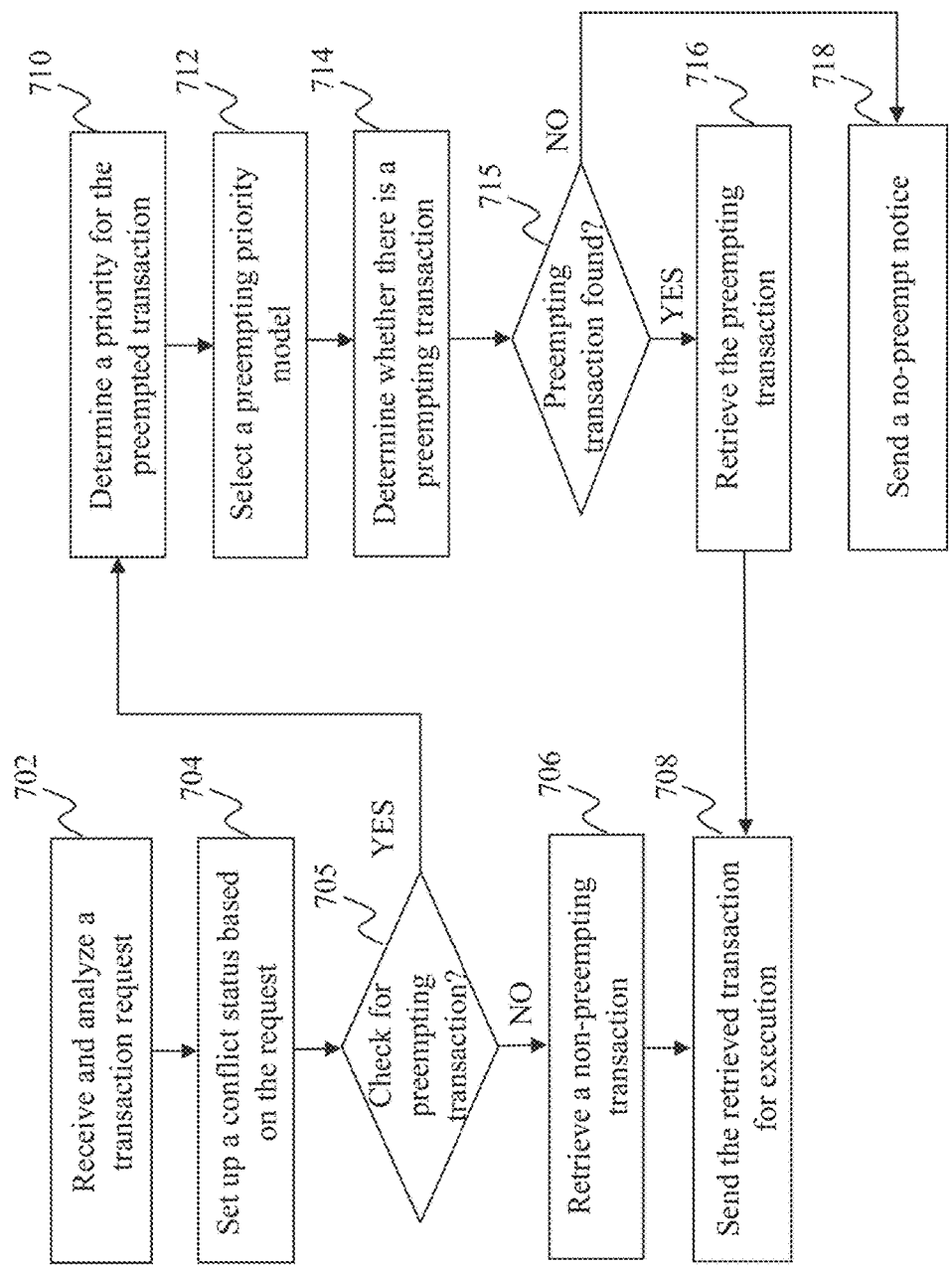
FIG. 7 is a flowchart of an exemplary process performed by a transaction scheduler, according to an embodiment of the present teaching.

FIG. 7 is a flowchart of an exemplary process performed by a transaction scheduler, e.g. the transaction scheduler 416 in FIG. 6, according to an embodiment of the present teaching. At 702, a transaction request is received and analyzed. At 704, a conflict status for the partition is set up based on the request.

At 705, it is determined that whether the request is for a preempting transaction. If so, the process goes to 710, where a priority is determined for the preempted transaction; and the process goes to 712. Otherwise, the request is for a non-preempting transaction, and the process goes to 706, where a non-preempting transaction is retrieved. Then at 708, the retrieved transaction is sent for execution.

At 712, a preempting priority model is selected, e.g. based on information about the preempted transaction. At 714, the selected preempting priority model may be utilized to determine whether there is a preempting transaction. At 715, it is checked that whether a preempting transaction is found at 714. If so, the process goes to 716, where the preempting transaction is retrieved, and the process goes to 708 to send the retrieved transaction for execution, in response to the transaction request. Otherwise, the process goes to 718, where a no-preempt notice is generated and sent in response to the transaction request.

Figure 8:
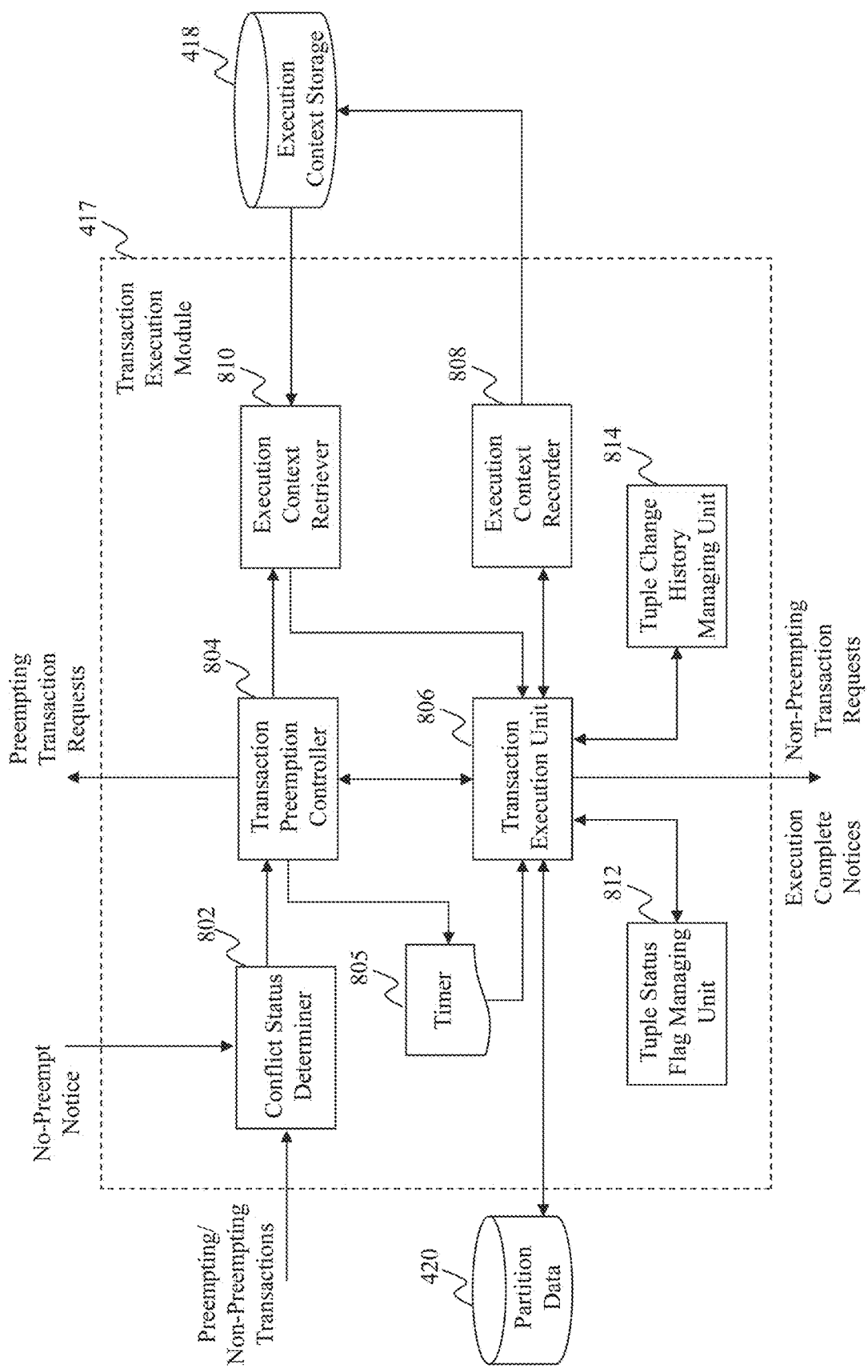
FIG. 8 illustrates an exemplary diagram of a transaction execution module, according to an embodiment of the present teaching.

FIG. 8 illustrates an exemplary diagram of a transaction execution module 417, according to an embodiment of the present teaching. The transaction execution module 417 in this example includes a conflict status determiner 802, a transaction preemption controller 804, a timer 805, a transaction execution unit 806, an execution context recorder 808, an execution context retriever 810, a tuple status flag managing unit 812, and a tuple change history managing unit 814.

The conflict status determiner 802 in this example receives a transaction or a notice from the transaction scheduler 416. The transaction may be a non-preempting transaction or a preempting transaction in response to a transaction request sent from the transaction execution module 417 to the transaction scheduler 416. The notice may be a no-preempt notice in response to a preempting transaction request sent from the transaction execution module 417 to the transaction scheduler 416.

In one embodiment, the conflict status determiner 802 determines the conflict status of the partition based on the transaction or notice received from the transaction scheduler 416. For example, a preempting transaction may indicate there is an existing preempted transaction in the partition. In another example, a non-preempting transaction may indicate there is not an existing preempted transaction in the partition. In yet another example, a no-preempt notice may indicate there is an existing preempted transaction in the partition. In another embodiment, the conflict status determiner 802 determines the conflict status of the partition by retrieving the conflict status from an execution thread specific variable. The conflict status determiner 802 may send the conflict status and information about the transaction or notice to the transaction preemption controller 804.

The transaction preemption controller 804 in this example controls transaction execution and preemption. In one embodiment, the transaction preemption controller 804 determines that a non-preempting transaction is received. In this case, the transaction preemption controller 804 determines a workload mixing scheme associated with the non-preempting transaction and may send a portion of the transaction to the transaction execution unit 806 for execution. For example, if the workload mixing scheme indicates to check preemption after every plan node of the query, the transaction preemption controller 804 may send a plan node to the transaction execution unit 806 for execution. After the transaction execution unit 806 executes the plan node, the transaction preemption controller 804 may send a preempting transaction request to the transaction scheduler 416 to request for a preempting transaction. In another example, if the workload mixing scheme indicates to check preemption after executing the transaction for a certain period of time, the transaction preemption controller 804 may send the transaction or part of the transaction to the transaction execution unit 806 for execution and send a message to the timer 805 to record execution time of the transaction. After the transaction execution unit 806 executes the transaction for the certain time period, the transaction preemption controller 804 may send a preempting transaction request to the transaction scheduler 416 to request for a preempting transaction.

In another embodiment, the transaction preemption controller 804 determines that a preempting transaction is received. In this case, the transaction preemption controller 804 informs the transaction execution unit 806 to switch to execute the preempting transaction. After the transaction execution unit 806 executes the preempting transaction, the transaction preemption controller 804 informs the execution context retriever 810 to retrieve execution context for the preempted transaction, such that the transaction execution unit 806 can continue executing the preempted transaction. In one example, the system supports preemption nesting, and the transaction preemption controller 804 will control the execution of the preempting transaction according to its associated workload mixing scheme, such that the transaction preemption controller 804 may send a preempting transaction request to the transaction scheduler 416 after the current preempting transaction is executed for a certain time period or after a given part of the current preempting transaction is executed. In another example, after the preempted transaction resumes, the transaction preemption controller 804 may determine again whether to yield the CPU core to check for preemption or not. This may be determined based on how many times the preempted transaction has been preempted and/or how long the preempted transaction has been executed.

In yet another embodiment, the transaction preemption controller 804 determines that a no-preempt notice is received. This means there is no preempting transaction found for the preempted transaction. In one example, the execution context recorder 808 in the transaction execution module 417 has recorded execution context for the preempted transaction before the transaction execution module 417 requests for a preempting transaction. Then, the transaction preemption controller 804 informs the execution context retriever 810 to retrieve the execution context for the preempted transaction, such that the transaction execution unit 806 can continue executing the preempted transaction. In another example, the execution context recorder 808 in the transaction execution module 417 does not record execution context for the preempted transaction until a preempting transaction is found. In this case, the transaction preemption controller 804 may directly inform the transaction execution unit 806 to continue executing the preempted transaction.

The transaction execution unit 806 in this example executes the portion of the transaction received from the transaction preemption controller 804 according to a level of granularity. The transaction execution unit 806 executes the transaction with respect to the partition data 420. When the conflict status indicates that there is an existing preempted transaction on the partition, the tuple status flag managing unit 812 may manage tuple status flags for the tuples processed by the transaction executed by the transaction execution unit 806, and the tuple change history managing unit 814 may manage the tuples' change histories accordingly.

After executing the portion of the transaction, the transaction execution unit 806 can determine whether execution of the transaction on the partition is complete. If so, the transaction execution unit 806 can generate and send an execution complete notice to the transaction complete notifying unit 408. If the transaction is a preempted transaction, the transaction execution unit 806 may then send a non-preempting transaction request to the transaction scheduler 416 to request for another non-preempting transaction. If the transaction is a preempting transaction, the transaction execution unit 806 may switch back to continue executing the preempted transaction, based on retrieved execution context of the preempted transaction.

Otherwise, if execution of the transaction on the partition is not complete, the transaction execution unit 806 may inform the execution context recorder 808 to record execution context after executing the portion, and informs the transaction preemption controller 804 to send a preempting transaction request to the transaction scheduler 416 to request for a preempting transaction.

The execution context recorder 808 in this example records into the execution context storage 418 execution context of a preempted transaction executed by the transaction execution unit 806. The execution context may include any temporary tables, certain pointers like row/block iterators, plan definitions, etc. that are related to the preempted transaction. In one embodiment, the execution context recorder 808 informs the transaction execution unit 806 that recording of the execution context is complete, such that the transaction execution unit 806 can request for a preempting transaction via the transaction preemption controller 804.

The execution context retriever 810 in this example retrieves from the execution context storage 418 the execution context of a preempted transaction and sends the retrieved execution context to the transaction execution unit 806 for continuing the execution of the preempted transaction.

Figure 9:
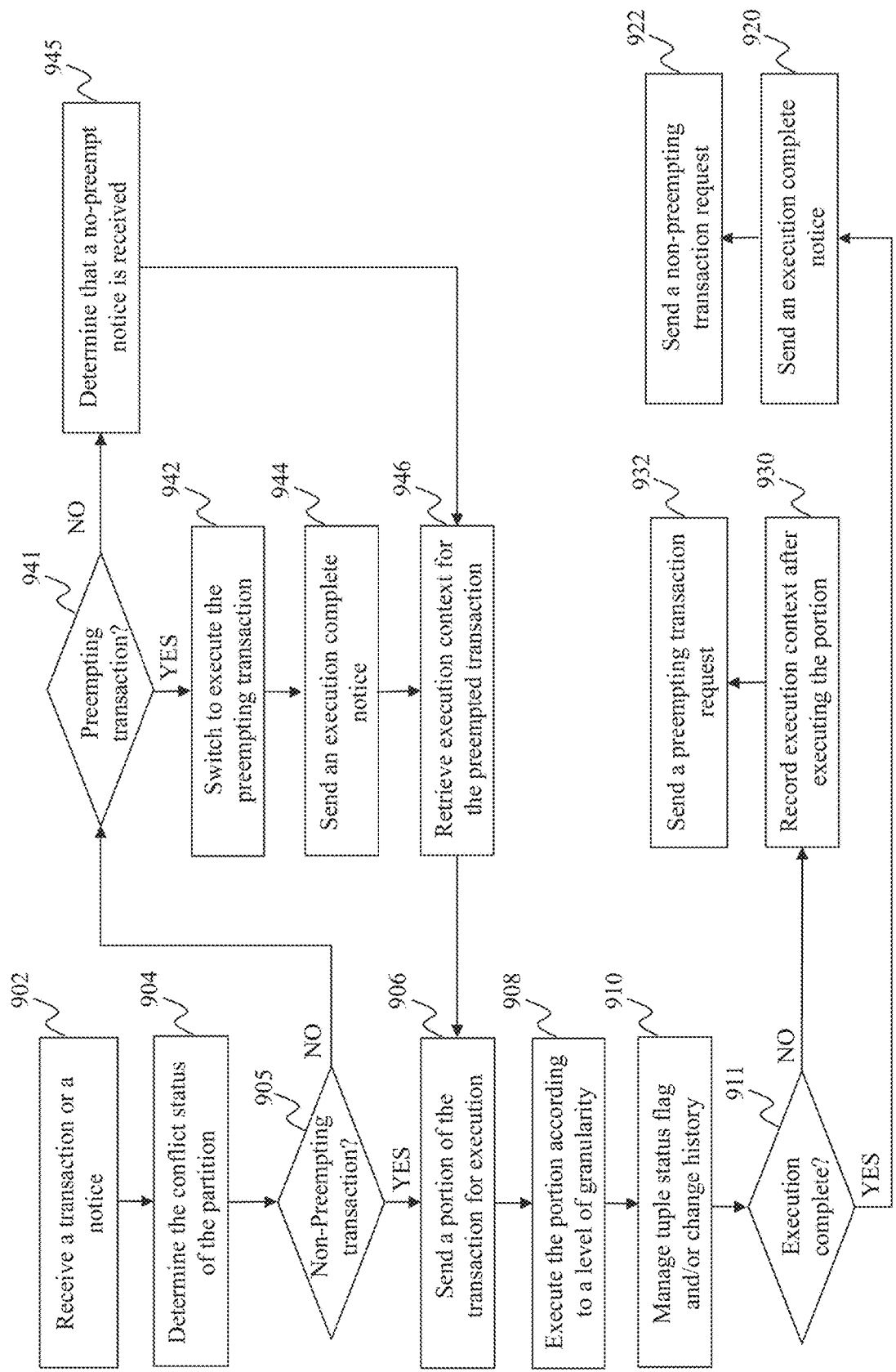
FIG. 9 is a flowchart of an exemplary process performed by a transaction execution module, according to an embodiment of the present teaching.

FIG. 9 is a flowchart of an exemplary process performed by a transaction execution module, e.g. the transaction execution module 417 in the FIG. 8, according to an embodiment of the present teaching. At 902, a transaction or a notice is received. At 904, the conflict status of the partition is determined. At 905, it is determined whether a non-preempting transaction is received. If so, the process goes to 906. Otherwise, the process goes to 941 to determine whether a preempting transaction is received. If so, the process goes to 942. Otherwise, the process goes to 945 to determine that a no-preempt notice is received, and the process goes to 946.

At 906, where a non-preempting transaction is received, a portion of the transaction is determined and sent for execution. At 908, the portion is executed according to a level of granularity. At 910, tuple status flags and/or tuples' change histories are managed during and/or after the execution. At 911, it is determined whether execution of the transaction on the partition is complete. If so, the process goes to 920, where an execution complete notice is generated and sent, and then at 922, a non-preempting transaction request is generated and sent to request for another non-preempting transaction. Otherwise, the process goes to 930, where execution context for the preempted transaction is recorded after executing the portion, and then at 932, a preempting transaction request is generated and sent to request for a preempting transaction.

At 942, where a preempting transaction is received, the transaction execution module 417 may switch to execute the preempting transaction. At 944, an execution complete notice is generated and sent after the execution of the preempting transaction is complete. In case of preemption nesting, more steps related to preemption may happen between 942 and 944. At 946, execution context for the preempted transaction is retrieved, and the process goes to 906 to continue executing the preempted transaction.

Figure 13:
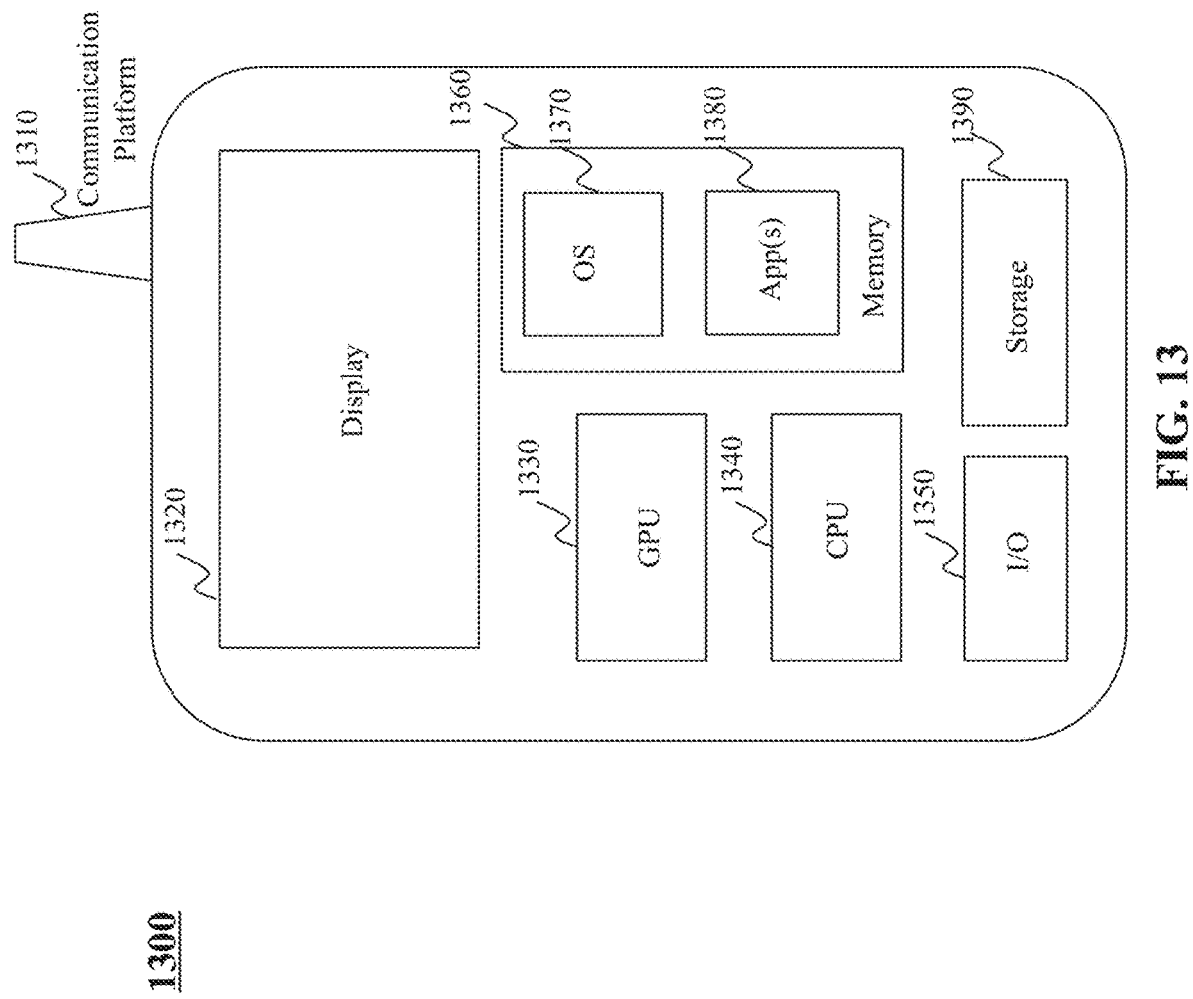
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device used by the user to communicate with the data clusters 140 is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for transmitting transaction requests and receiving transaction complete notices on the mobile device 1300. User interactions with content related to data processing may be achieved via the I/O devices 1350 and provided to the data clusters 140, e.g., via the network 120.

To implement various modules, units, and their functionalities described in the present disclosure, computer hardware platforms may be used as the hardware platform(s) for one or more of the elements described herein (e.g., the node 310 and/or the execution engine 410 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies to schedule data transactions as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
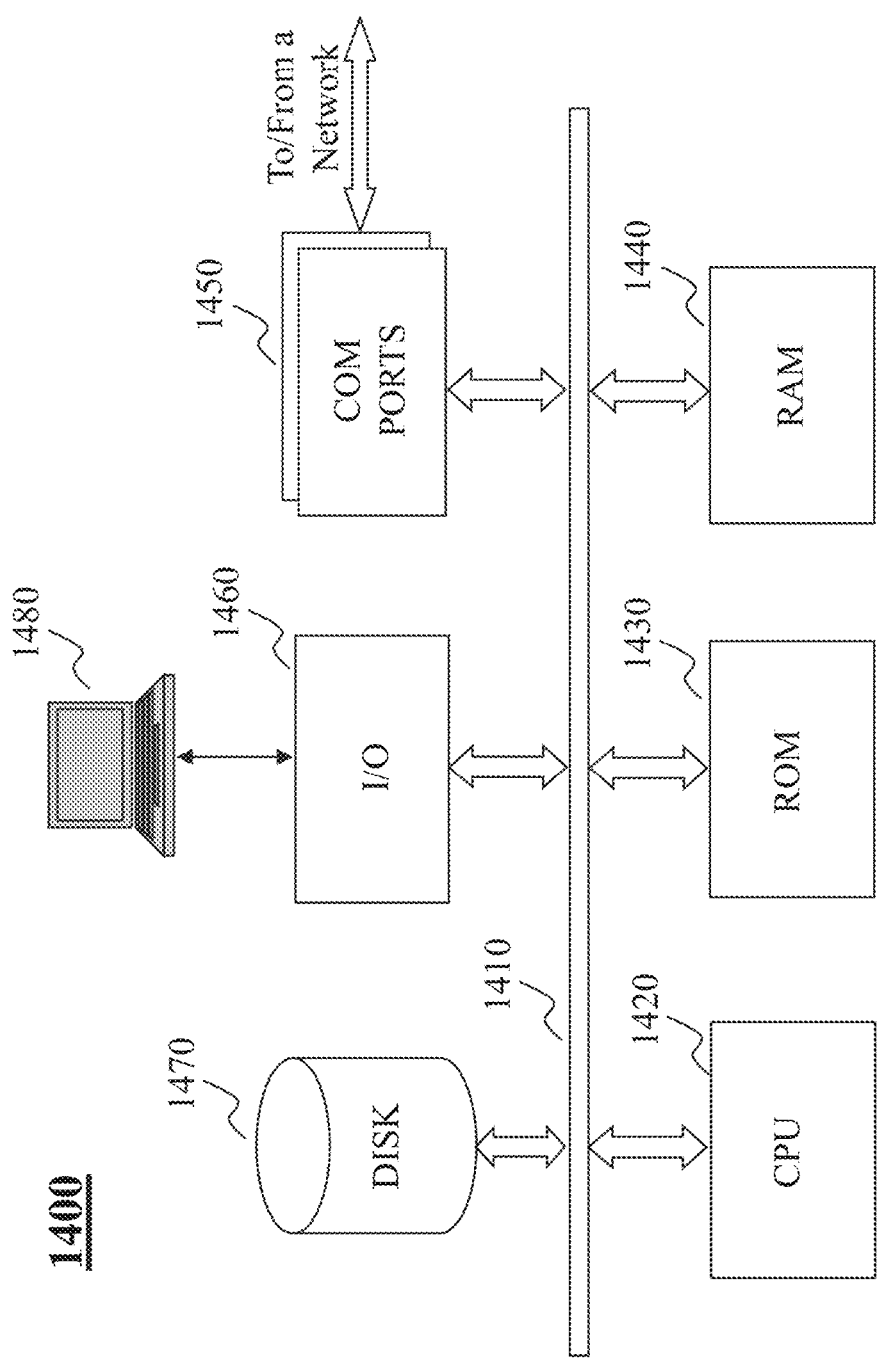
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the transaction scheduling and switching techniques, as described herein. For example, the node 310 may be implemented on a computer such as computer 1400, via its hardware, software program, firmware, or a combination thereof. Although only one such computer is shown, for convenience, the computer functions relating to scheduling transactions as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of transaction scheduling and switching, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a node or other big data server into the hardware platform(s) of a computing environment or other system implementing a computing environment or similar functionalities in connection with transaction scheduling and switching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the transaction scheduling and switching as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for scheduling transactions at a node, the method comprising:

initiating a first transaction directed to a portion of data at the node, the first transaction being associated with a preemption criterion;

suspending the first transaction in response to the preemption criterion being satisfied;

identifying, in response to the suspending, a second transaction that is directed to the portion of data at the node in accordance with a priority model;

carrying out the second transaction at the node; and setting a status flag for at least one record included in the portion of data based on the second transaction, the status flag indicating a manner by which the at least one record is modified by the second transaction so that upon being resumed, the first transaction is to face a same state of the portion of data as when being suspended.

2. The method of claim 1, wherein the priority model is selected based on information related to a first transaction.

3. The method of claim 2, wherein the priority model identifies the second transaction based on a user associated with the first transaction.

4. The method of claim 1, wherein the preemption criterion is one of:

the first transaction running for a pre-determined period of time since the first transaction was initiated or last suspended; and a first portion of the first transaction having been executed since the first transaction was initiated or last suspended, wherein the first portion is at least one of: a fragment of the first transaction, a step in a fragment, a pre-determined number of blocks in a step, and a pre-determined number of records in a step.

5. The method of claim 1, further comprising:

continuing the first transaction after the second transaction is completed or when the second transaction is executed for a period of time.

6. The method of claim 1, further comprising:

recording an execution context for the first transaction before carrying out the second transaction; and retrieving the execution context and the status flag after carrying out the second transaction.

7. A machine-readable, non-transitory and tangible medium having information recorded thereon for scheduling transactions at a node in a data system, wherein the information, when read by the machine, causes the machine to perform the following:

initiating a first transaction directed to a portion of data at the node, the first transaction being associated with a preemption criterion;

suspending the first transaction in response to the preemption criterion being satisfied;

identifying, in response to the suspending, a second transaction that is directed to the portion of data at the node in accordance with a priority model;

carrying out the second transaction at the node; and setting a status flag for at least one record included in the portion of data based on the second transaction, the status flag indicating a manner by which the at least one record is modified by the second transaction so that upon being resumed, the first transaction is to face a same state of the portion of data as when being suspended.

8. The medium of claim 7, wherein the priority model is selected based on information related to a first transaction.

9. The medium of claim 8, wherein the priority model identifies the second transaction based on a user associated with the first transaction.

10. The medium of claim 7, wherein the preemption criterion is one of:

the first transaction running for a pre-determined period of time since the first transaction was initiated or last suspended; and a first portion of the first transaction having been executed since the first transaction was initiated or last suspended, wherein the first portion is at least one of: a fragment of the first transaction, a step in a fragment, a pre-determined number of blocks in a step, and a pre-determined number of records in a step.

11. The medium of claim 7, the method further comprising:

continuing the first transaction after the second transaction is completed or when the second transaction is executed for a period of time.

12. The medium of claim 7, the method further comprising:

recording an execution context for the first transaction before carrying out the second transaction; and retrieving the execution context and the status flag after carrying out the second transaction.

13. A system, having at least one processor, storage, and a communication platform connected to a network for scheduling transactions at a node in a data system, the system comprising:

a transaction execution module configured for:

initiating a first transaction directed to a portion of data at the node, the first transaction being associated with a preemption criterion;

suspending the first transaction in response to the preemption criterion being satisfied;

identifying, in response to the suspending, a second transaction that is directed to the portion of data at the node in accordance with a priority model;

carrying out the second transaction at the node; and setting a status flag for at least one record included in the portion of data based on the second transaction, the status flag indicating a manner by which the at least one record is modified by the second transaction so that upon being resumed, the first transaction is to face a same state of the portion of data as when being suspended.

14. The system of claim 13, wherein the priority model is selected based on information related to a first transaction.

15. The system of claim 14, wherein the priority model identifies the second transaction based on a user associated with the first transaction.

16. The system of claim 13, wherein the preemption criterion is one of:

the first transaction running for a pre-determined period of time since the first transaction was initiated or last suspended; and a first portion of the first transaction having been executed since the first transaction was initiated or last suspended, wherein the first portion is at least one of: a fragment of the first transaction, a step in a fragment, a pre-determined number of blocks in a step, and a pre-determined number of records in a step.

17. The system of claim 13, wherein the transaction execution module is further configured for:

continuing the first transaction after the second transaction is completed or when the second transaction is executed for a period of time.

18. The system of claim 13, wherein the transaction execution module is further configured for:

recording an execution context for the first transaction before carrying out the second transaction; and
retrieving the execution context and the status flag after carrying out the second transaction.

* * * * *